2,777,758

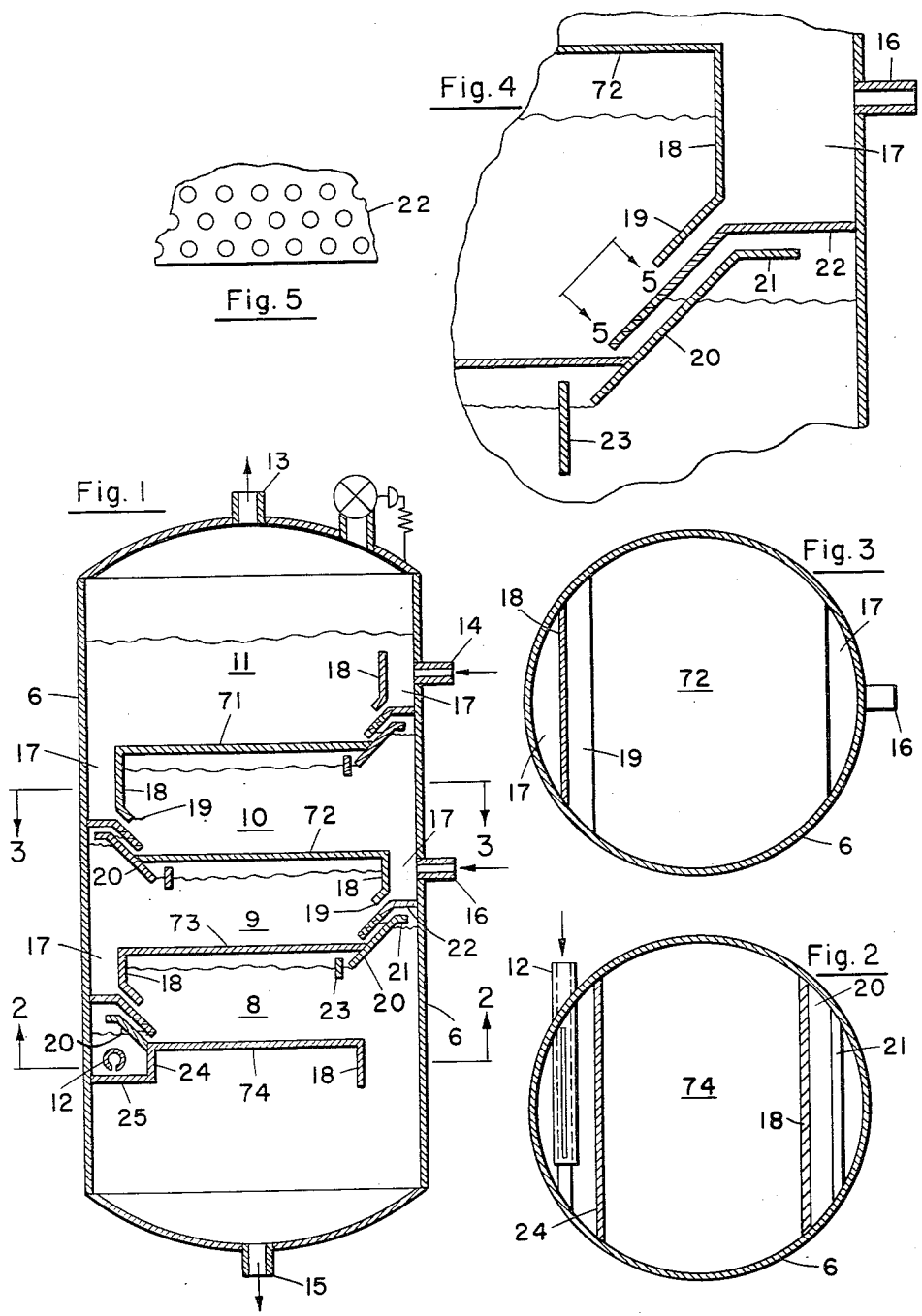
Jan. 15, 1957 — O. S. POKORNY ET AL — 2,777,758
LIQUID-LIQUID CONTACTING APPARATUS
Filed Oct. 15, 1954
Inventors: Oldrich S. Pokorny, Michael H. Farmer
By J. A. Reilly, Attorney United States Patent Office 2,777,758
Patented Jan. 15, 1957

LIQUID-LIQUID CONTACTING APPARATUS

Oldrich S. Pokorny and Michael H. Farmer, Sarnia, Ontario, Canada, assignors to Esso Research and Engineering Company, a corporation of Delaware Application October 15, 1954, Serial No. 462,590

4 Claims. (Cl. 23—270.5)

The present invention relates to a liquid-liquid contacting process and apparatus. More specifically, the invention pertains to a process and an apparatus for intimately contacting two liquids of different specific gravities, the less dense liquid being introduced at the bottom to flow upward and the more dense liquid being introduced at the top. Under such operating conditions, the energy required for mixing is derived entirely or primarily from the gravity differential between the two liquids. This application is a continuation-in-part of application Serial No. 355,956, filed May 19, 1953.

A specific application of the apparatus and process of this invention refers to the solvent extraction of lubricating oils and the like, wherein a solvent of different specific gravity than the oils, e. g. mineral hydrocarbon oils, is used to remove certain soluble ingredients in the lubricating oil. For example, certain mineral lubricating oil compounds such as Mid-Continent stocks and other non-paraffinic oils contain substantial portions of aromatic and other cyclic ingredients which tend to depress the viscosity index of the lubricating oil. Such oils tend also to be unstable at high temperatures, forming oil-insoluble sludge under some conditions. These oils can be considerably improved by removing the objectionable ingredients by solvent extraction. Certain selective solvents such as phenol, furfural, etc. have the property of dissolving the aromatic constituents when intimately contacted with the oil. These solvents, which are of higher specific gravity than mineral lubricating oils, settle downwardly carrying the objectionable aromatic and related ingredients with them. The raffinate oil gravitates upwardly and is eventually removed for use or for further processing as desired. Other solvents such as methanol are lighter than mineral oils and accordingly gravitate upward from the oils.

In the present description the invention will be described largely by reference to a typical phenol extraction process for treating lubricating oil fractions, but it will be understood that the invention is applicable to other processes where intimate mixing of two different liquids and subsequent separation by gravity are involved.

It will be understood that all references hereinafter to oil will include the oil phase generically, i. e. oil containing some dissolved or entrained solvent (e. g. phenol). Likewise reference to solvent or to phenol will be understood to include the solvent or phenol phase, i. e. solvent such as phenol containing dissolved or entrained oil. Aqueous phenol, which is commonly introduced in conventional extracting processes, is also included in the solvent or phenol phase.

The invention also has application to other liquid-liquid contacting applications. For example, in the pharmaceutical and chemical industries, it is often desirable to extract a certain desired component from aqueous solution my means of a solvent that is lighter than water. In such an instance (e. g. where the continuous phase liquid is the lighter phase), the contacting apparatus arrangements described herein should, for the best operation of equipment, be arranged upside down. Consequently, the reversal of the plate arrangement involving the cascade flow with periods of intimate mixing of two different liquids is to be included as being within the skill of those familiar with the art.

In the prior art numerous types of contacting apparatus have been known. In some of these a tower in the form of a vertical cylindrical vessel or equivalent is provided with a series of transverse plates or partitions, and the two liquids to be contacted are introduced respectively at the top and bottom, the denser liquid material going in at the top. The transverse partitions or plates are so arranged that the descending liquid flows over each plate, and downwardly to the next lower plate in cascade fashion. At the same time, the less dense liquid rises upwardly against the bottom of each plate and flows counter-currently to be descending liquid. The plates are so arranged as to cause as intimate a mixing of the liquids as is practicable, and flow restrictions are occasionally provided in the plates to maintain a layer of the discontinuous phase liquid adjacent each plate.

A particular object of the present invention is to improve the intimacy of mixing without substantially reducing the free separation of the two liquids after they have contacted together. In other words, it is a particular object to improve the overall extraction efficiency of liquid-liquid apparatus and processes.

A further object of the invention is to avoid the excessive entrainment of one liquid in the other, after sufficient contacting has been effected to carry out the desired function. Thus, it is an object of the invention to provide improved contacting capacity. Other objects and advantages of the invention such as improved operability will also become apparent as this description proceeds.

Before entering a detailed description of the present invention, it is considered desirable to define and discuss briefly some of the terms that will be used in the following description. For example, it will be noted that the efficiency of a liquid-liquid contacting apparatus and/or process may be determined on a relative or on an absolute basis. Thus, relative values may be obtained by a comparison of quality/yield/phenol treat data for two contacting towers or processes that operate on the same feedstocks. Absolute values may be obtained by the evaluation of stage to stage samples (conventional X—Y diagram analysis) that are obtained from a multistage contacting apparatus or process; or they may be obtained by comparison between the performance of any given apparatus or process with the performance that is obtained by a theoretical contacting stage or set of stages.

In comparing the performance of any given contacting stage with the performance of a thoretical stage, it will be observed that one theoretical stage is established by contacting two liquids intimately to equilibrium in a batch mixture followed by a thorough and complete settling in a batch settler. On this basis, the stage efficiencies of conventional perforated plates and similar contacting devices is generally less than about 50%.

The term "operability" is more difficult to define than is the term "efficiency"; and it is also more difficult to measure on a quantitative basis. To some extent, ease of operation is a matter of personal opinion depending on the criterion by which it is judged. But, in the present description, it will be considered that the operability of an apparatus or process is quantitatively placed in one of four classes depending upon whether it (1) experiences trouble-free operations wherein desired conditions are easy to establish and maintain; (2) experiences an occasional difficulty that is easy to correct; (3) experiences fair or variable performance that is sometimes trouble-free but sometimes difficult to diagnose and to correct; (4) experiences unsatisfactory performance, requiring constant attention to get any sort of results.

Having defined to some extent the terminology that will be referred to in the present description, reference is now made to the attached drawings wherein:

Fig. 1 shows diagrammatically a vertical section of one form of apparatus that embodies certain features of the invention.

Fig. 2 is a plan view of an element of the apparatus of Fig. 1 taken substantially along the line 2—2 of Fig. 1 and looking in the direction of the arrows.

Fig. 3 is another plan view of an element of the apparatus of Fig. 1 taken substantially along the line 3—3 of Fig. 1 and again looking in the direction of the arrows.

Fig. 4 is a detailed, enlarged vertical sectional view of a portion of the apparatus that is illustrated in Fig. 1.

Fig. 5 is an enlarged plan view of a small portion of the apparatus that is illustrated in Fig. 4, looking in the direction of the arrows.

Referring specifically now to Fig. 1, there is shown a vertical vessel having outer side walls 6, preferably in the form of a right circular cylinder with a vertical axis. Within the vessel 6 is a series of horizontally disposed and vertically spaced transverse plates 71, 72, 73 and 74 which divide the vessel into superposed contacting stages 8, 9, 10 and 11.

It will be understood that a relatively large number of transverse plates and contacting stages would be used in a complete commercial installation. For example, it will usually be found desirable to use from 8 to 20 or more of such plates and stages. For the solvent extraction of lubricating oil, it is preferable to use from about 10 to 18 or more of these plates or stages.

Each of the transverse plates possesses a horizontal portion that extends substantially across a major part of the transverse section of the vessel 6. This portion of each plate will be understood to be secured to the inner wall surfaces of the vessel by suitable welding, riveting or other conventional means. Near one side of each plate, however, the plate is formed with an upturned lip portion which extends upwardly a few inches. At its laterally opposite side, the plate is turned downward to form a second lip portion which extends in a substantially opposite direction vertically with respect to the first lip portion. Successive plates within the vessel are laterally opposite to one another in that the first lip portion of one plate is vertically below and adjacent the second lip portion of the next adjacent plate. This positioning of the plates relative to one another is clearly illustrated in Fig. 1. The result of this positioning is to assure a tortuous flow pattern for both phases within the vessel. Thus, in Fig. 1, the phenol flows in a laterally opposite direction in each succeeding contacting stage.

The structure of the transverse plates and of the lip portions that are attached thereto is more clearly illustrated in Fig. 4. Referring to this figure, it will be seen that the apparatus illustrated therein is an enlarged detailed view of the lip portions that are associated with transverse plates 72 and 73 in Fig. 1. Considering first the first lip portion which is attached to plate 73, it will be seen that this first lip portion is represented by an angularly disposed or inclined imperforate plate 20 which extends both vertically above and below plate 73. Plate 20 is fastened by rivetting, welding or equivalent means to the interior wall surface of vessel 6 and is also sealed as illustrated to a portion of the periphery of plate 73. Plate 20 may form an acute angle of between 30° and 60° with plate 72 and preferably forms an angle of about 45°.

The portion of plate 20 that extends vertically below plate 73 functions to entrap a layer of oil beneath the latter plate. It is contemplated that plate 20 extend far enough beneath plate 73 to provide an oil layer of about 3 to 6 inches in depth. For most situations, an oil layer depth of about 4 inches is particularly preferred.

The portion of plate 20 that extends vertically above plate 72 preferably does so to a distance of several inches, preferably about 12 inches. At its upper end, plate 20 is welded or otherwise sealed to a short plate member 21 which is substantially horizontally disposed and laterally spaced from the inner wall surface of vessel 6 as illustrated. Plate 21 may thus be considered as a lip member which is sealed along its inner periphery to plate 20 and at its lateral edges to the walls of vessel 6.

The second lip portion of each transverse plate is represented by plate 18 in Fig. 4. Plate 18 is substantially vertically disposed and is sealed at its upper edge to plate 72 in a manner to form, in combination with the inner wall surfaces of vessel 6, a vertically disposed conduit 17. It is apparent that the length of lip portion 18 depends largely on the tray spacing which for practical purposes should be at least about 20 inches to 24 inches. Tray spacing of at least this magnitude permits ready access for repairmen and other personnel. For a tray spacing of 2 feet-6 inches, plate 18 should be about 12 inches long.

At this point it will be noted that the vertical distance between plate 72 and plate 73 is governed to a great extent by the nature of the liquids that are being contacted within the overall apparatus. Thus, the ease with which the liquids are mixed and separated and also the volumes of the liquids that are handled are related to the distance that it will be necessary to provide between successive transverse plates. In the case under consideration wherein oil and phenol constitute the two liquids, it is desired that the distance between plates 72 and 73 be about 20 to 36 inches and preferably about 30 inches.

Lip member 18 is sealed along its lower edge to another lip portion 19 which is inclined from the horizontal at an angle of about 45° and directed centrally of vessel 6. Thus, plate 19 is substantially parallel to plate 20, but it is not as long as plate 20 for reasons that will be brought out more clearly in the following paragraph:

A partially perforated deflector plate 22 is positioned parallel to and intermediate lip members 19 and 20 to form a first conduit intermediate plate 19 and plate 22 and a second conduit intermediate plate 20 and plate 22.

It will be seen in Fig. 4 that the bottom edge of deflector plate 22 terminates in vertical spaced relation with the upper surface of plate 73. Plate 22 then extends at an angle of about 45° with respect to the horizontal (and substantially parallel to both plates 19 and 20) to a point substantially vertically beneath the lower edge of plate 18. At this point, plate 22 is bent to form a substantially horizontal portion which extends laterally outward from the center of vessel 6 and is sealed to the wall of the vessel.

The lower portion—i. e. the portion nearest plate 73 —of plate 22 is perforated to provide fluid access through the plate in a direction substantially normal to the plate. The perforations are sized to provide adequate cross sectional area for the entire flow of oil (or other discontinuous phase liquid that is passed through the apparatus). A particularly preferred form of perforation consists of a plurality of cylindrical or drilled holes that are equilaterally pitched with respect to each other as shown in Fig. 5.

The perforate portion of plate 22 is positioned laterally inward and spaced from the lower edge of lip member 19. The perforate portion is also positioned laterally below and spaced from the upper edge of plate 20 and the upper surface of plate 21.

To fully consider the motivation for the arrangement of the various lip members and plates described above, it is best to next consider briefly the plate 23. This latter plate is substantially vertical disposed and laterally spaced from the lower edge of plate 20 in a direction toward the center of vessel 6. The upper edge of plate 23 is in vertical spaced relationship with the lower surface of plate 73, and the lower edge of plate 22 is spaced vertically intermediate plate 73 and the next lower transverse plate. The lower edge of plate 23 is preferably positioned a distance from plate 73 at least slightly in excess of the greatest depth of oil contemplated to ever exist beneath plate 73.

The horizontal portions of plates 21 and 22 in each stage are preferably provided with one or more small vent holes to permit the escape of any air or other gas that may be entrapped beneath the plates. These vents should be sized so as to permit the flow of gas without permitting undue amounts of liquids to bypass the stage. Thus, in a commercial-size tower several holes about 1/8" to 1/4" in diameter should suffice. These holes also permit the drainage of discontinuous phase liquid from the apparatus such as may be required when changing from one such liquid to another.

Having described the structural characteristics of the various plates and associated lip members, etc., the actual operation of the apparatus will now be described. At the outset of this description, it will be assumed that vessel 6 has been filled with phenol in a conventional manner and that oil has then been introduced within the vessel and to form a separate oil layer beneath each plate and also beneath each deflector plate. Further assuming for the moment that the flow of oil is interrupted, it will be appreciated that the status of the apparatus and the operation will be as illustrated in Fig. 4. In other words, a layer of oil will exist beneath plate 73 to the level imposed by the lower edge of plate 20. A similar oil layer will exist beneath plate 72. Indeed, a separate layer of oil will exist in each stage as is illustrated in Fig. 1.

A second oil layer will exist in each contacting stage beneath the deflector plate that is associated with the particular stage. Thus, in Fig. 4, a layer of oil is depicted beneath deflector plate 22. This oil layer is entrapped in this position due to the relative positions and structure of plates 22 and 21. The oil layer extends vertically downward within the conduit that lies between plate 20 and plate 22 to the level of the highest perforations that are provided in the lower portion of the latter plate.

Assuming now that oil is introduced within vessel 6, it will be seen that additional oil eventually gathers beneath each of the transverse plates. For example, in Fig. 4, additional oil collects below plate 73 from which position it eventually flows over the upper edge of plate 22 and beneath the lower edge of plate 20. In such case, plate 23 serves as a dam to prevent any emulsified oil and phenol or unsettled oil from flowing over plate 20; and only completely settled oil lying immediately adjacent plate 73 is permitted to flow over the lower edge of plate 20 which serves as a weir. The oil spilling over this weir edge of plate 20 flows substantially along the under surface of this plate and up into the oil layer that is trapped beneath deflector plate 22. The angular orientation of plate 20 provides a stream-lined type of flow for the oil.

Once trapped beneath plate 22, the oil flows around the outer edge of plate 21 and through the conduit between plates 20 and 21 and plate 22 vertically downward in a stream-line flow pattern to the perforations in the lower portion of plate 22. At this point, the oil jets through the perforations in plate 22 in a direction substantially normal to the stream of phenol that in turn flows downward through conduit 17 and the conduit between plates 19 and 22. As a result of this cross-current flow between the oil and phenol streams, intimate mixing of the two streams occurs and extends a slight lateral distance within stage 10.

The advantages of the above-described apparatus and process are several. First, the oil or other discontinuous phase liquid that leaves one contacting stage and enters the next stage is well settled and free of emulsion. Second, the flow of both the oil and phenol streams is streamlined and accordingly marked by low pressure drop and emulsion-forming tendencies. Third, an oil seal is provided between each pair of adjacent contacting stages with the result that bypassing of the stages is substantially eliminated. Fourth, a liquid seal is automatic in that it is continuously maintained over a wide range of flow rates and operating conditions. Fifth, an intimate and efficient degree of mixing is provided. Sixth, excellent contacting is also provided by virtue of the fact that a degree of phenol recirculation is provided along the upper surface of plate 73 in the vicinity of plate 22. A degree of oil recirculation also occurs in the region vertically above the perforations in plate 22 and slightly laterally inward thereof.

Having described in detail the structure and the functioning of the individual contacting stages of the present apparatus, the overall operation of the present invention may be even better understood by further consideration of the embodiments that are illustrated in Figs. 1–3. As pointed out hereinbefore, the apparatus of Fig. 1, as illustrated, is considered to be operating on a stream of phenol serving as the continuous phase liquid and a stream of mineral oil serving as a discontinuous phase liquid. Accordingly, vessel 6 of Fig. 1 is provided with a phenol inlet connection 14 and a spent phenol outlet connection 15. It is further provided with an oil inlet conduit 12 and an oil outlet conduit 13. It is additionally provided with a back pressure control valve 40 which automatically maintains the pressure within vessel 6 below a desired value. Vessel 6 may also be provided with such features as air vent connections, flow control valves, interface control means, pumps, heaters and other equipment that are conventionally employed in liquid-liquid contacting apparatus and processes.

In line with conventional procedures, vessel 6 may initially be filled with phenol which is introduced by means of conduit 14. It will be noted that the vessel may also be started up by first filling it with oil. The former procedure, however, is preferred.

It will be observed that conduit 14 is illustrated as piercing vessel 6 and terminating within the downcomer conduit leading to the entrance portion of contacting stage 11. While this positioning of conduit 14 is preferred, it will be noted that this particular conduit may be conveniently positioned in other portions of the uppermost section of vessel 6.

Once phenol has filled vessel 6, oil may then be introduced as by means of conduit 12. Conduit 12 may pierce vessel 6 and be adapted to feed oil into the bottommost stage 8 in several different ways. A particularly preferred method, however, is that illustrated in Figs. 1 and 2 where conduit 12 terminates within a box-like chamber formed by plates 24 and 25 in conjunction with the walls of the vessel 6 and the deflector plate 20.

As particularly illustrated in Fig. 2, it may be seen that conduit 12 is slotted along its underside in order to better distribute the oil within this portion of the vessel as the oil enters the vessel. Having once entered vessel 6, the flow of the oil is substantially that described hereinbefore in connection with Fig. 4. In other words, the oil first enters contacting stage 8 where it mixes with phenol that enters the stage by means of conduit 41. In stage 8, the oil and phenol are mixed and subsequently separated to form separate phenol and oil phases. The phenol phase continues down through the vessel and eventually leaves by means of conduit 15. The oil, on the other hand, collects below plate 73 and flows by means of baffle 23, lip member 20 and deflector plate 22 into contacting stage 9. In the latter stage it is again contacted with phenol which in this instance enters stage 9 by means of downcomer conduit 17 from the phenol phase in stage 10. As before, the oil and phenol mix within stage 9 and then separate into their individual phases. This procedure is repeated in stages 10 and 11 until the oil eventually collects in the uppermost portion of vessel 6 from which it is withdrawn by means of conduit 13.

In connection with the apparatus of Fig. 1, it will be observed that a number of additional features may be incorporated therein. For example, it is generally desirable to provide the highest parts of the deflector plates and the lowest parts of the transverse plates with weep holes to permit complete drainage of oil and phenol from the vessel when the vessel is not in use or when it is being cleaned. Further, it may also be desirable in some cases to feed part of the oil within the vessel above one or more of the plates that are disposed near the bottom of the vessel in order to provide for better phenol and oil separations within the lower portion of the vessel. Likewise, phenol may be introduced below one or more plates at the top of the vessel in order to provide for better oil separation in this section of the vessel. The capacity of the vessel may be generally increased by adoption of this procedure.

In extracting lubricating oils with phenol, a phenol and water spray is often useful as is well known in the art. Such a spray is indicated at 16 in Figs. 1 and 3. The use of about 1-3 weight percent of water, preferably 1½ to 2½% based on the phenol, aids operability. At this point it will be particularly observed that conduit 16 pierces vessel 6 in a manner designed to introduce the phenolic-aqueous stream within a phenol downcomer 17 between stages 10 and 9. Previous to this time, it has been conventional to introduce such streams (1) below the oil feed point, i. e. near the bottom of the tower; (2) at or very slightly below the phenol feed point, i. e. near the top of the tower. In accordance with the present invention, the downcomer position for the termination of conduit 16 is preferred for the reason that serious emulsion problems are thereby avoided. The rapid flow of phenol in the downcomers readily dissolves the water and distributes it throughout the phenol phase. Once in the phenol phase, the water improves phase separation and controls the solubility of the oil in the phenol.

As a specific example of the best mode of carrying out the present invention, the description of a specific apparatus and process for utilization in the phenol extraction of mineral oils is given below. This example is particularly adapted for handling about 90 barrels per day per sq. ft. of tower cross-sectional area of a Western Canadian lube distillate having a viscosity of 80 SSU at 210° F. The phenol treat employed is about 175 vol. percent, based on the oil. The temperature of operation is preferably about 160° F. at the bottom of the tower and 180° F. at top. The operating pressure is substantially atmospheric.

The apparatus for carrying out in the specific operation above may be about 11 ft. in diameter and 52 to 53 ft. high. It may possess about 16 separate contacting stages with a stage spacing of about 2½ ft. The lip members of the transverse plates in the various contacting stages should be arranged to provide an oil layer of about 5 inches beneath each of the transverse plates. Furthermore, it is desired that the perforated portion of each deflector plate consist of about 18 rows of %2" diameter holes, placed on a 13/32" equilateral pitch. The bottom end of the perforated deflector plate should not extend extend more than about ½" from the upper surface of the transverse plate which it approaches.

An apparatus corresponding to the above general design has been evaluated in the phenol extraction of a number of Mid-Continent, Western Canadian and Venezuelan lube oil fractions. The results of these studies indicate that the present invention provides results that are markedly superior to those that are attainable with conventional contacting process and apparatus. For example, it has been determined that an absolute stage efficiency (entrainment-free basis) of at least 40% and generally from 50% to 75% greater than the best conventional stage efficiencies have been made possible by the present invention. Furthermore, oil capacities of the order of at least 20% more than conventional capacities have been realized; and decreased oil entrainment to the extent from about 55% to less than 5% has been now observed. Expressed in another way, it may be stated that the present invention makes possible a reduced phenol treat for the same values of oil flow rate and quality. Alternatively, the invention makes possible the attainment of greatly improved product quality for the same phenol treat and oil throughput.

The invention also provides an apparatus and process that is particularly characterized by improved operability in that entrainment, conditions of upset, and other operating difficulties have been substantially completely eliminated. The invention makes possible an operation that is substantially automatic and trouble-free.

In conclusion, it will be realized that a number of variations may be incorporated within the present invention without departing from the spirit or scope thereof. Thus, conventional emulsion-breaking means such as bundles of wire mesh and the like may be employed within the various settling zones in order to assist in the attainment of rapid phase separation. Further, the apparatus may be constructed of any conventional materials and may be provided with the usual gauges, valves, heaters, controllers, and the like.

What is claimed is:

1. An apparatus for countercurrently contacting two partially miscible liquids having different specific gravities wherein one of the liquids is present as a continuous phase and the second liquid as a discontinuous phase which comprises a vessel adapted to contain liquids, a plurality of vertically spaced, horizontally disposed, transverse imperforate plates within said vessel dividing the vessel into a plurality of vertically superposed treating stages, conduit means for introducing the two liquids in stages at opposite ends of said vessel, the heavier liquid being introduced within the uppermost stage, conduit means for removing the contacted liquids from the vessel, each transverse plate having a first lip member at one margin of the plate and a second lip member at the opposite margin of the plate, the first lip members of successive plates being laterally opposite one another within said vessel, each first lip member inclined at an angle of about 45° with respect to its transverse plate and extending in opposite directions from this transverse plate, the laterally outer end of each said first lip member located vertically nearer than the laterally inner end to the continuous phase liquid entrance to said vessel and being sealed to a horizontally disposed third lip member terminating in spaced relation with the wall of said vessel, a vertically disposed baffle plate spaced laterally inward from the inner end of each said first lip member and vertically spaced from the adjacent transverse plate, the second lip member of each transverse plate being vertically disposed and terminating in vertical spaced relationship with the first lip member of the next adjacent transverse plate, the terminal portion of each said second lip member being inclined at an angle of about 45° toward the center line of said vessel, a deflector plate sealed to the inner wall surface of said vessel and extending inward of said vessel vertically intermediate and spaced from the first lip member of each plate and the second lip member of the next adjacent plate, the inner portion of each said deflector plate being perforate, the perforate portion being spaced laterally inward of the inner terminal intermediate its respective transverse plate and the inner terminal of its respective second lip member.

2. An apparatus for countercurrently contacting two incompletely miscible liquids having different specific gravities wherein one of the liquids is present as a continuous phase and the second liquid as a discontinuous phase which comprises a vertically disposed vessel adapted to contain liquids; a plurality of vertically spaced, horizontally disposed, transverse imperforate plates within said vessel dividing the vessel into a plurality of vertically superposed treating stages; first conduit means for introducing the continuous phase liquid within a stage at a first end of said vessel; second conduit means for introducing the discontinuous phase liquid within a stage at the opposite end of said vessel; the heavier liquid being introduced within the uppermost stage; third conduit means for withdrawing the continuous phase liquid from said opposite end of the vessel; fourth conduit means for withdrawing the discontinuous phase liquid from said first end of the vessel, the heavier liquid being withdrawn from the lowest stage; each transverse plate being sealed to the inner wall surface of the vessel and having a first lip member at one margin of the plate; each transverse plate also having a second lip member at the laterally opposite margin of the plate, the first lip members of successive plates being laterally opposite one another within said vessel; each first lip member being inclined at an angle of from 30 to 60° with respect to its transverse plate and extending in opposite directions from the transverse plate; the laterally outer end of each said first lip member being located vertically nearer than the laterally inner end to said first conduit means; a horizontally disposed third lip member being sealed to the laterally outer end of each said first lip member and terminating in spaced relation with the inner wall surface of the vessel; the second lip member of each transverse plate extending vertically toward said second conduit means and terminating in vertically spaced relationship with the third lip member of the next adjacent transverse plate; the terminal portion of each second lip member extending slightly laterally inward of said vessel and substantially parallel to the first lip member of the next adjacent transverse plate; a deflector plate sealed to the inner wall surface of the vessel and extending inward of said vessel vertically intermediate and spaced from each said second lip member and the first and third lip members of the next adjacent transverse plate; the laterally inner portion of each said deflector plate being perforate and spaced inward of the terminal portion of its respective second lip member; and a vertically disposed baffle plate spaced laterally inward from the inner end of each first lip member and vertically spaced from both adjacent transverse plates.

3. An apparatus as defined in claim 2 in which the first lip member of each transverse plate is inclined at an angle of about 45 degrees.

4. An apparatus as defined in claim 2 in which the vertical distance between the transverse plates is between about 20 and 36 inches.

References Cited in the file of this patent

UNITED STATES PATENTS

| | | |
|---|---|---|
| 1,651,354 | Alexander | Dec. 6, 1927 |
| 2,501,114 | Whaley | Mar. 21, 1950 |
| 2,609,276 | Casler et al. | Sept. 2, 1952 |
| 2,669,505 | Rhys et al. | Feb. 15, 1954 |